United States Patent
Mohammedali Asadullah et al.

(10) Patent No.: US 12,406,499 B2
(45) Date of Patent: Sep. 2, 2025

(54) METHOD AND SYSTEM FOR OPTIMIZING TRANSMISSION OF USER RELEVANT EVENTS

(71) Applicant: INFOSYS LIMITED, Bangalore (IN)

(72) Inventors: Allahbaksh Mohammedali Asadullah, Dharwad District (IN); Monirul Islam, Bangalore (IN); Hitesh Champalal, Bangalore (IN); Anant Pande, Bangalore (IN); Ansa Davis, Bangalore (IN); Anupam Behera, Bangalore (IN); Ayazahmed Kazi, Dharwad District (IN)

(73) Assignee: Infosys Limited, Bangalore (IN)

( * ) Notice: Subject to any disclaimer, the term of this patent is extended or adjusted under 35 U.S.C. 154(b) by 4 days.

(21) Appl. No.: 18/585,316

(22) Filed: Feb. 23, 2024

(65) Prior Publication Data
US 2024/0331380 A1 Oct. 3, 2024

(30) Foreign Application Priority Data
Mar. 29, 2023 (IN) .............................. 202341023182

(51) Int. Cl.
G06V 20/40 (2022.01)
G11B 27/031 (2006.01)
G11B 27/34 (2006.01)

(52) U.S. Cl.
CPC .............. *G06V 20/44* (2022.01); *G06V 20/41* (2022.01); *G06V 20/46* (2022.01); *G06V 20/49* (2022.01); *G11B 27/031* (2013.01); *G11B 27/34* (2013.01); *G06T 2200/24* (2013.01); *G06V 2201/10* (2022.01)

(58) Field of Classification Search
CPC ........ G06V 20/44; G06V 20/49; G06V 20/46; G06V 20/41; G11B 27/031; G11B 27/34
See application file for complete search history.

(56) References Cited

U.S. PATENT DOCUMENTS

2022/0374301 A1* 11/2022 Arcand .............. G06Q 10/0633
2023/0237897 A1* 7/2023 Tang ...................... G08B 29/18
382/103

* cited by examiner

*Primary Examiner* — Mishawn N. Hunter
(74) *Attorney, Agent, or Firm* — Finnegan, Henderson, Farabow, Garrett & Dunner LLP

(57) ABSTRACT

The disclosure relates to a method and a system for optimizing transmission of user relevant events. The method includes generating an event metadata for a user relevant event from an event snippet of the user relevant event. The event snippet is obtained from a multimedia content. The multimedia content includes at least one of an audio stream or a video stream. The method further includes transmitting the event metadata associated with the user relevant event. The event metadata includes a set of frames associated with the user relevant event, a start timestamp and an end time stamp associated with the user relevant event, and key information associated with the user relevant event. The method further includes reconstructing a segment of the multimedia content associated with the user relevant event based on the event metadata.

15 Claims, 6 Drawing Sheets

METHOD AND SYSTEM FOR OPTIMIZING TRANSMISSION OF USER RELEVANT EVENTS

TECHNICAL FIELD

This application claims the benefit of Indian Patent Application No. 202341023182, filed Mar. 29, 2023, which is incorporated by reference in its entirety.

The present disclosure relates to data transmission, and more particularly to a method and a system for optimizing transmission of user relevant events.

BACKGROUND

In today's digital age, we find ourselves swimming in an ocean of data. The rapid growth in the volume of data generated, consumed, and transmitted over networks has revolutionized the way we live and work. However, this enormous surge in data comes with its own set of challenges, particularly when it comes to the transmission of data over networks. As data volume continues to escalate, the difficulty in ensuring smooth, efficient, and accurate transmission of data is a growing concern, especially for industries working in security sectors, healthcare sectors, natural disasters sectors, and the like. The escalating volume of data presents a multifaceted challenge in the realm of data transmission over networks. Moreover, the transmission of video data, which is a data-intensive process, requires a great amount of bandwidth, which can be expensive and pose a significant obstacle to providing video services in low-bandwidth environments. This limitation can be particularly challenging in applications such as physical security or remote monitoring, where a high volume of video data must be transmitted from the edge location to cloud storage.

Traditionally existing techniques of data transmission suffer from delays, network congestion, and inefficiencies that can compromise the effectiveness of the transmission of important incidents, due to the unavailability of required bandwidth to transmit the data. Some conventional incident transmission methods often rely on manual processes, centralized broadcasting methods, or simple broadcast protocols. Moreover, to reduce the bandwidth required for the transmission, these conventional methods typically rely on compression of frames and super resolution techniques. While these approaches may be suitable for certain scenarios, they frequently encounter limitations when addressing complex and dynamic environments, or limited bandwidth. These limitations include limited scalability, lack of customization, vulnerability to network congestion, and inability to provide context-rich incident data. Additionally, existing techniques may lack the capability to prioritize and optimize incident transmission based on the severity, location, and impact of the incident, resulting in inefficient allocation of resources and response efforts.

The present invention is directed to overcome one or more limitations stated above or any other limitations associated with the known arts.

SUMMARY

In one embodiment, a method for optimizing transmission of user relevant events is disclosed. In one example, the method may include generating an event metadata for a user relevant event from an event snippet of the user relevant event by a first Artificial Intelligence (AI) model. The event snippet is obtained from a multimedia content, and the multimedia content includes at least one of an audio stream or a video stream. Further, the method may include transmitting the event metadata associated with the user relevant event by the first AI model to a second AI model. The event metadata includes a set of frames associated with the user relevant event, a start timestamp and an end time stamp associated with the user relevant event, and key information associated with the user relevant event. The method may further include reconstructing a segment of the multimedia content associated with the user relevant event based on the event metadata by the second AI model.

In another embodiment, a system for optimizing transmission of user relevant events is disclosed. In one example, the system may include a processing circuitry and a memory communicatively coupled to the processing circuitry. The memory may store processor-executable instructions, which, on execution, may cause the processing circuitry to generate an event metadata for a user relevant event from an event snippet of the user relevant event by a first Artificial Intelligence (AI) model. The event snippet is obtained from a multimedia content, and the multimedia content includes at least one of an audio stream or a video stream. The processor-executable instructions, on execution, may further cause the processing circuitry to transmit the event metadata associated with the user relevant event by the first AI model to a second AI model. The event metadata includes a set of frames associated with the user relevant event, a start timestamp and an end time stamp associated with the user relevant event, and key information associated with the user relevant event. The processor-executable instructions, on execution, may further cause the processing circuitry to reconstruct a segment of the multimedia content associated with the user relevant event based on the event metadata by the second AI model.

In yet another embodiment, a non-transitory computer-readable medium storing computer-executable instructions for optimizing transmission of user relevant events is disclosed. In one example, the stored instructions, when executed by a processing circuitry, cause the processing circuitry to perform operations including generating an event metadata for a user relevant event from an event snippet of the user relevant event by a first Artificial Intelligence (AI) model. The event snippet is obtained from a multimedia content, and the multimedia content includes at least one of an audio stream or a video stream. The operations may further include transmitting the event metadata associated with the user relevant event by the first AI model to a second AI model. The event metadata includes a set of frames associated with the user relevant event, a start timestamp and an end time stamp associated with the user relevant event, and key information associated with the user relevant event. The operations may further include reconstructing a segment of the multimedia content associated with the user relevant event based on the event metadata by the second AI model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
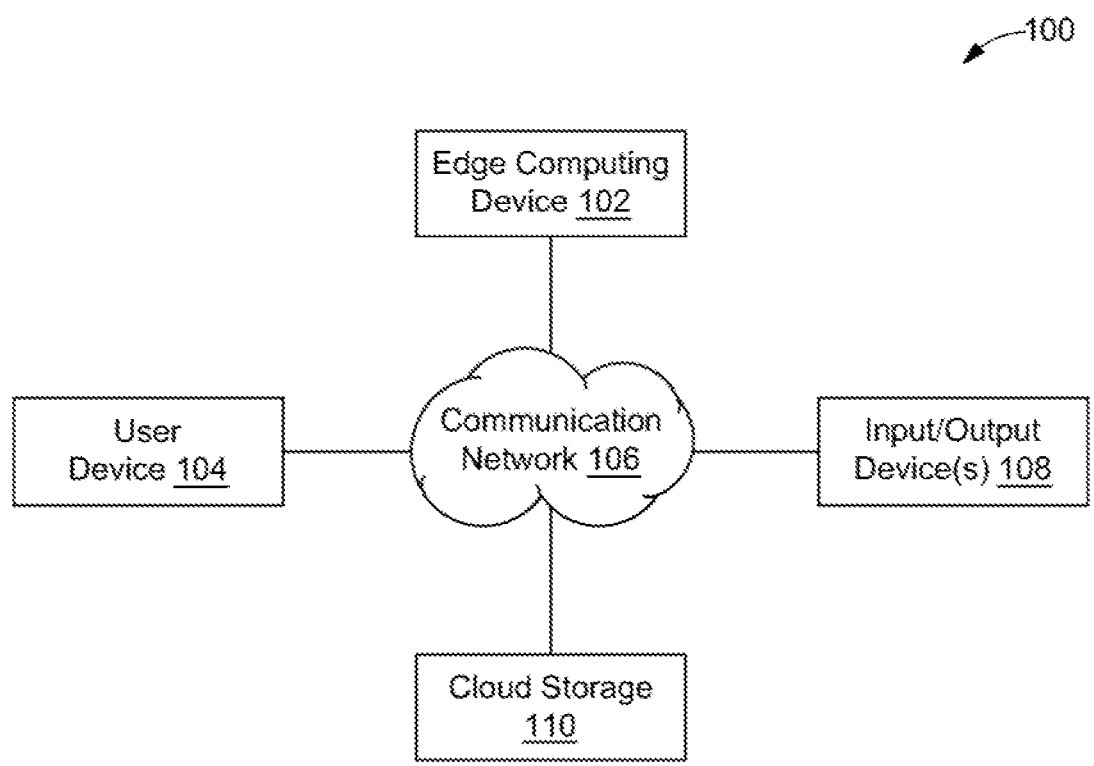
FIG. 1 illustrates a block diagram of an environment for optimizing transmission of user relevant events, in accordance with an exemplary embodiment of the present disclosure.

FIG. 1 is a block diagram that illustrates an environment 100 for optimizing transmission of user relevant events, in accordance with an exemplary embodiment of the present disclosure. The environment 100 may include an edge computing device 102, a user device 104, an Input/Output device(s) 108, and a cloud storage 110.

The edge computing device 102, the user device 104, the Input/Output device 108, and the cloud storage 110 are configured to communicate with each other via a communication network 106 for sending and receiving various data. Examples of the communication network 106 may include, but are not limited to a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof.

Examples of the edge computing device 102 may include, but are not limited to a server, a smartphone, an application server, a laptop, a desktop, a mobile phone, a tablet, and the like. The edge computing device 102 in conjunction with the user device 104 may be configured to optimize the transmission of a user relevant event. In an embodiment, the user relevant event may correspond to an incidence of importance or an incidence of user interest. Further, to optimize the transmission, the edge computing device 102 may perform various operations. For example, the operations may include receiving multimedia content, identifying the user relevant event, extracting an event snippet of the user relevant event, extracting a start timestamp and an end timestamp of the user relevant event, generating an event metadata associated with the user relevant event, transmitting the event metadata, and the like.

Further, examples of the user device 104 may include but are not limited to a server, a smartphone, an application server, a laptop, a desktop, a mobile phone, a tablet, and the like. In order to optimize the transmission, the user device 104 may be configured to reconstruct a segment of the multimedia content associated with the user relevant event from the event metadata. Further, to reconstruct the user relevant event, the user device 104 may perform various operations. For example, the operations may include retrieving the event metadata and generating the segment of the multimedia content corresponding to the user relevant event.

In order to optimize the transmission of the user relevant event, initially, the edge computing device 102 may be configured to receive the multimedia content from the Input/Output device 108. The multimedia content may include at least one of an audio stream or a video stream. As will be appreciated, the multimedia content may be one of pre-stored multimedia content, or real-time multimedia content. Further, examples of the Input/Output device 108 may include, but are not limited to a mouse, a microphone, a webcam, a closed-circuit television (CCTV) camera, or a surveillance camera. By way of an example, suppose the edge computing device 102 may receive a real-time video feed (i.e., the multimedia content) from one or more CCTV cameras (i.e., the Input/Output device(s) 108). The one or more CCTV cameras may be configured to capture the video feed of the area in real-time, in which they are installed to continuously monitor the area. Further, the video feed captured by the one or more CCTV cameras may be transmitted to the edge computing device 102 in real-time, through the communication network 106. Upon receiving the multimedia content, the edge computing device 102 may be configured to generate the event metadata for the user relevant event.

In order to generate the event metadata, initially, the edge computing device 102 may be configured to identify the user relevant event from the multimedia content. The user relevant event may be identified from the multimedia content based on an associated set of event parameters. By way of example, the associated set of event parameters may include, but is not limited to a type of event, one or more objects (e.g., a vehicle, a person, an animal, and the like) identified during an occurrence of the event, pose or movement of the object during the event, features (e.g., a type of object, color of the, object) associated with the object, and suspicious activity associated with the object, and the like.

Further, the edge computing device 102 may identify the user relevant event via a first Artificial Intelligence (AI) model implemented within the edge computing device 102. In an embodiment, the first AI model may correspond to an event detection model. Examples of the event detection model may include, but are not limited to a Recurrent Neural Network (RNN) model, a Convolution Neural Network (CNN) model, a Long-Short Term Memory (LSTM) model, a Deep Neural Network (DNN) model, and radical function networks. Further, the first AI model may be trained to detect user relevant events based on a plurality of training event parameters associated with a plurality of training events. Upon identifying the user relevant event, the first AI model may extract the event snippet of the user relevant event. In addition to the event snippet, the edge computing device 102 may be configured to extract the start timestamp and the end timestamp of the user relevant event, and the key information associated with the user relevant event from the event snippet. Examples of the key information may include, but are not limited to an object type, an object location, object movements and postures, an activity performed by the object, features of the object, real-time information of surroundings to identify any missing item, and any other similar event relevant features.

Once details, i.e., the start timestamp, the end timestamp, and the key information associated with the user relevant event are identified, then the first AI model may be configured to generate the event metadata based on the details and the event snippet. The event metadata may include a set of frames associated with the user relevant event, the start timestamp and the end time stamp associated with the user relevant event, and the key information associated with the user relevant event. It should be noted that each of the set of frames may be generated based on the event snippet of the user relevant event. Once the event metadata is generated, the first AI model may be configured to store the event metadata within a database. The datastore may be present within a memory of the edge computing device 102. In some embodiments, the edge computing device 102 may be configured to transmit and store the event metadata on the cloud storage 110.

Further, the edge computing device 102 may transmit the generated event metadata to the user device 104, through the communication network 106. In particular, the event metadata may be transmitted by the first AI model to a second AI model implemented within the user device 104. To transmit the event metadata to the second AI model, initially, the second AI model may receive a user input corresponding to the user relevant event. Upon receiving the user input, the second AI model may retrieve the event metadata from the first AI model. In other words, the first AI model may transmit the event metadata to the second AI model upon receiving a request from the second AI model to retrieve the event metadata. In some embodiments, the second AI model may retrieve the event metadata from the cloud storage 110 through the communication network 206.

Examples of the cloud storage 110 may include, but are not limited to, a server, database, or cloud storage service like Amazon Web Services (AWS), google cloud, etc. The cloud storage 110 may be configured to store the event metadata which may be further retrieved by the user device 104 to reconstruct the segment of multimedia content associated with the user relevant event. Upon retrieving the event metadata, the second AI model of the user device 104 may be configured to utilize the event metadata to reconstruct the segment of the multimedia content associated with the user relevant event. Further, the reconstructed segment may be rendered to a user via a Graphical User Interface (GUI) of the user device 104. As will be appreciated, the second AI model may correspond to an image diffusion model. The image diffusion model may employ an image diffusion technique for reconstruction of the segment. Examples of the image diffusion model may include, but are not limited to, a stable diffusion model, a denoising diffusion probabilistic model, a noise-conditioned score network, a stochastic differential equation, and the like.

In some embodiments, upon identification of the user relevant event and generation of the event metadata, the edge computing device 102 may be configured to notify via an alert message to the user of the user device 104. Further, upon receiving the alert message, the user may provide the user input, for example, a selection of an option to display the user relevant event. Upon receiving the user selection, the second AI model of the user device 104 may perform reconstruction of the segment associated with the user relevant event using the above-discussed technique. Once the segment of the user relevant is reconstructed, the second AI model may render the reconstructed segment to the user. This is further explained in detail in conjunction with FIGS. 1-6.

As will be appreciated, in some embodiment, the edge computing device 102 may have the intelligence of both the edge computing device 102 and the user device 102 to optimize the transmission of the user relevant event. In other words, the first AI model and the second AI model may reside within the memory of the edge computing device 102. Further, the edge computing device 102 may transmit and render the reconstructed segment of the multimedia content via the GUI of the user device 102.

The above discussed technique of the transmission of the user relevant event may reduce the bandwidth required to transmit the user relevant event by a significant amount without sacrificing the representational quality of the user relevant event. Overall, the above discussed technique of the transmission, represents a significant step forward in the field of incident transmission (including video and audio feed) that requires transmitting and storing of the multimedia content (particularly for video content) offering a new way to reduce bandwidth requirements and enable delivery of multimedia content services in low-bandwidth environments. As such, it is likely to have a major impact on a wide range of industries, from security, and surveillance to remote monitoring and beyond.

In other words, the above-discussed technique may be beneficial for security, surveillance, and monitoring applications where hundreds and thousands of cameras are continuously generating a vast amount of multimedia content that needs to be stored and often transferred. In these applications, the ability to reduce the bandwidth required to transmit and store video data and audio data is essential. This is because the cost of bandwidth is prohibitively high, especially in remote locations where the available bandwidth is limited or is reduced so as to secure places like national borders. By reducing the amount of the multimedia content that needs to be transmitted and stored, the above-discussed technique may help to overcome these challenges and make it possible to provide a detailed view of an incident (i.e., the user relevant event) even in the most bandwidth-constrained environments.

For example, in security applications, where an ability to monitor and respond to events in real-time is critical, the above-discussed technique may enable security personnel to access high-quality video feeds even in locations where the available bandwidth is limited. This may help to improve situational awareness and enhance response times, which is crucial in preventing or responding to security incidents. Similarly, in remote monitoring applications, where the ability to transmit and store large amounts of video incident data is essential, the above-discussed technique may help to overcome the limitations of available bandwidth. This may increase possibilities for monitoring critical infrastructure, such as pipelines, power grids, and transportation systems, even in locations where the available bandwidth is limited.

Figure 2:
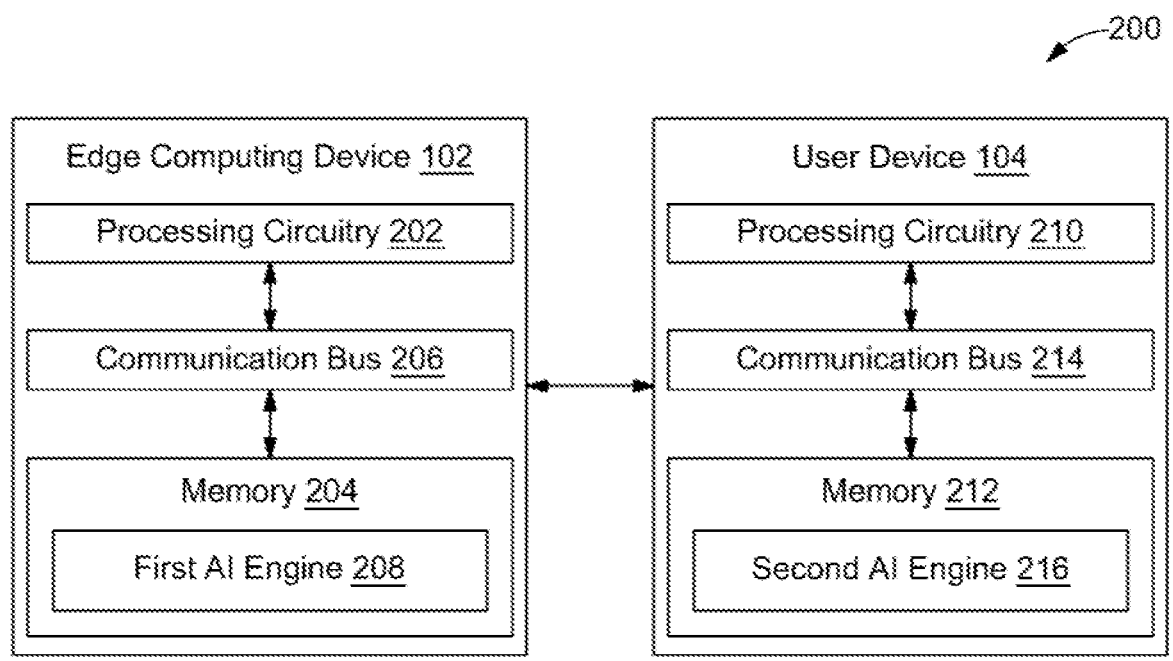
FIG. 2 illustrates a block diagram of various engines within an edge computing device and a user device configured for optimizing transmission of user relevant events, in accordance with some embodiments of the present disclosure.

FIG. 2 is a block diagram of various engines within the edge computing device 102 and the user device 104 configured for optimizing transmission of user relevant events, in accordance with an exemplary embodiment of the present disclosure. FIG. 2 is explained in conjunction with FIG. 1.

The edge computing device 102 may include a processing circuitry 202, and a memory 204 communicatively coupled to the processing circuitry 202 via a communication bus 206.

Further, the user device 104 may include a processing circuitry 210, and a memory 212 communicatively coupled to the processing circuitry 210 via a communication bus 214. Further, the edge computing device 102 and the user device 104 may be communicatively coupled to each other via the communication network 106.

The memory 204 and the memory 212 may store various data that may be captured, processed, and/or required by the edge computing device 102 and the user device 104. The memory 204 and the memory 212 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.)

The memory 204 and the memory 212 may also store processor-executable instructions. The processor-executable instructions, when executed by the processing circuitry 202 and the processing circuitry 210, may cause the processing circuitry 202 and the processing circuitry 210 to implement one or more embodiments of the present disclosure such as, but not limited to, receiving multimedia content from at least one of a plurality of sources, identifying a user relevant event, generating event metadata, transmitting the event metadata, reconstructing a segment of the multimedia content associated with the user relevant event, presenting the reconstructed segment on a GUI, and the like. The memory 204 may include a first AI engine 208. The first AI engine 208 may correspond to the first AI model. The first AI model may be an event detection model. Examples of the event detection model may include, but are not limited to, a Recurrent Neural Network (RNN) model, a Convolution Neural Network (CNN) model, a Long-Short Term Memory (LSTM) model, a Deep Neural Network (DNN) model, and radical function networks.

Further, the memory 212 may include a second AI engine 216. The second AI engine 216 may correspond to the second AI model. The second AI model may be an image diffusion model. Examples of the image diffusion model may include, but are not limited to, a stable diffusion model, a denoising diffusion probabilistic model, a noise-conditioned score network, and a stochastic differential equation. The memory 204 and the memory 212 may also include a data store (not shown) for storing data and intermediate results generated by AI engines, i.e., the first AI engine 208 and the second AI engine 216. For example, the event metadata associated with the user relevant event may be stored in the data store.

Initially, the edge computing device 102 may be configured to receive multimedia content from at least one of a plurality of sources. The plurality of sources may include one or more Input/Output devices (same as the Input/Output device(s) 108). Examples of the plurality of sources may include, but are not limited to, a plurality of camera(s), (e.g., closed-circuit television (CCTV)_cameras, webcams, surveillance cameras), streaming services, or any other multimedia device(s). The multimedia content may include at least one of an audio stream or a video stream. Further, the multimedia content may be the pre-stored multimedia content or the real-time multimedia content. Upon receiving the multimedia content, the first AI engine 208 in conjunction with the processing circuitry 202 may be configured to generate the event metadata associated with the user relevant event. To generate the event metadata, the first AI engine 208 may be configured to identify a user relevant event from the multimedia content.

Upon identifying the user relevant event, the first AI engine 208 may be configured to extract an event snippet of the user relevant event. The user relevant event may be identified based on an associated set of event parameters. By way of example, the associated set of event parameters may include, but are not limited to a type of event, one or more objects (e.g., a vehicle, a person, an animal, and the like) identified during an occurrence of the event, poses or movements of an object during the event, features (e.g., a type of object, color of the object) associated with the object, and suspicious activity associated with the object, and the like. In addition to the event snippet, the first AI engine 208 may extract a start timestamp and an end timestamp associated with the user relevant event, and key information associated with the user relevant event from the event snippet.

As will be appreciated, the first AI engine 208 may be trained to detect user relevant events based on a plurality of training event parameters associated with a plurality of training events. Moreover, the first AI engine 208 may utilize advanced computer vision techniques to identify the user relevant event and extract details (i.e., the start timestamp and the end timestamp, and the key information) associated with the user relevant event. Further, the first AI engine 208 may be configured to generate the event metadata for the user relevant event. The event metadata may be generated using the event snippet and the details of the user relevant event. The event metadata may include a set of frames associated with the user relevant event, the start timestamp and the end time stamp associated with the user relevant event, and the key information associated with the user relevant event. As will be appreciated, the set of frames may be generated from the event snippet based on the key information of the user relevant event.

By way of an example, suppose at least one CCTV camera may be installed around and within a private property (such as land area owned by an individual) to monitor the private property to avoid any trespassing event. In this case, each of the at least one CCTV camera may be configured to capture video feed (i.e., the multimedia content) of the private property and send it to the edge computing device 102 in real-time. Now suppose, an unauthorized person may have visited the private property. In this case, upon receiving the video feed, the first AI engine 208 may be configured to identify a trespassing event (i.e., the presence of an unauthorized person). It should be noted that the trespassing event may correspond to the user relevant event.

In an embodiment, the first AI engine 208 may identify the trespassing event based on an associated set of trespassing event parameters. For example, to identify the trespassing event, movements and postures of the unauthorized person may be determined, color of clothes worn by the unauthorized person clothes may be identified, any suspicious activity performed by the unauthorized person may be detected, and the like. Upon identifying the trespassing event, the first AI engine 208 may extract an event snippet of the trespassing event.

In other words, the first AI engine 208 may extract a portion of the video feed in which the presence of the unauthorized person is detected. Further, the first AI engine 208 may extract a start timestamp and an end timestamp of the trespassing event along with key information of the trespassing event from the event snippet. In the current scenario, the start timestamp may correspond to a timestamp at which a first presence of the unauthorized person was detected within the private property. Further, the end timestamp may correspond to a timestamp until a last presence of the unauthorized person was detected within the private property. The key information, for example, may include location of a trespasser (i.e., the unauthorized person), movements and postures of the trespasser, information of surroundings before the trespassing event, any object wielded by the trespasser, information of the surroundings after the trespassing event, and any other similar event relevant features.

Once the event metadata is generated, the first AI engine 208 may be configured to transmit the event metadata associated with the user relevant event to the second AI engine 216. As will be appreciated, in one embodiment, the first AI engine 208 may store the event metadata within the datastore (not shown) of the memory 204. In some embodiments, the first AI engine 208 may transmit and store the event metadata on a cloud storage (i.e., on a server).

Further, the second AI engine 216 may retrieve the event metadata from the datastore or the cloud storage upon receiving a user input from a user of the user device 104. In other words, upon receiving the user input corresponding to the user relevant event, the second AI engine 216 in conjunction with the processing circuitry 210 may be configured to reconstruct a segment of the multimedia content associated with the user relevant event. To reconstruct the segment associated with the user relevant event, the second AI engine 218 may retrieve the event metadata from the datastore within the memory 204 or the cloud storage. Upon retrieving the event metadata, the second AI engine 216 may utilize the event metadata to reconstruct the segment of the multimedia content associated with the user relevant event.

In continuation to the above example, during the trespassing event, suppose an owner of the private property may be interested in viewing only a relevant segment of the video feed during which the presence of the unauthorized person was detected. In this case, the owner may send a user input to view the relevant segment of the video feed via his user device (same as the user device 104), for example, a smartphone, a laptop, a tablet, etc. In particular, the user may open an application (associated with the edge computing device 102) that is pre-installed in his smartphone and select a suitable option (i.e., the user input) to view the relevant segment. In this case, upon receiving the user input, the second AI engine 216 may retrieve the event metadata associated with the trespassing event from the datastore within the memory 204. Further, the second AI engine 216 may reconstruct the relevant segment of the trespassing event during which the presence of the unauthorized person was detected.

Once the segment of the multimedia content associated with the user relevant event is reconstructed, then the second AI engine 216 may present the segment to the user via a Graphical User Interface (GUI) of the user device 104. The segment of the multimedia content may include a portion of the user relevant event. In some embodiment, the second AI engine 216 may store the reconstructed segment within a datastore of the memory 212 for future reference by the user.

It should be noted that all such aforementioned engines 208 and 216 may be represented as a single module or a combination of different modules. Further, as will be appreciated by those skilled in the art, each of the engines 208 and 216 may reside, in whole or in parts, on one device or multiple devices in communication with each other. In some embodiments, each of the engines 208 and 216 may be implemented as a dedicated hardware circuit comprising custom application-specific integrated circuits (ASIC) or gate arrays, off-the-shelf semiconductors such as logic chips, transistors, or other discrete components. Each of the engines 208 and 216 may also be implemented in a programmable hardware device such as a field programmable gate array (FPGA), programmable array logic, programmable logic device, and so forth. Alternatively, each of the engines 208 and 216 may be implemented in software for execution by various types of processors (e.g., the processing circuitry 202 and the processing circuitry 210). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for optimizing transmission of user relevant events. For example, the exemplary edge computing device 102 and the user device 104 may optimize the transmission of multimedia content by the processes discussed herein. In particular, as will be appreciated by those of ordinary skill in the art, control logic and/or automated routines for performing the techniques and steps described herein may be implemented by the edge computing device 102 and the user device 104 either by hardware, software, or combinations of hardware and software. For example, suitable code may be accessed and executed by the one or more processors on the edge computing device 102 and the user device 104 to perform some or all of the techniques described herein. Similarly, application specific integrated circuits (ASICs) configured to perform some or all of the processes described herein may be included in the one or more processors on the edge computing device 102 and the user device 104.

Figure 3:
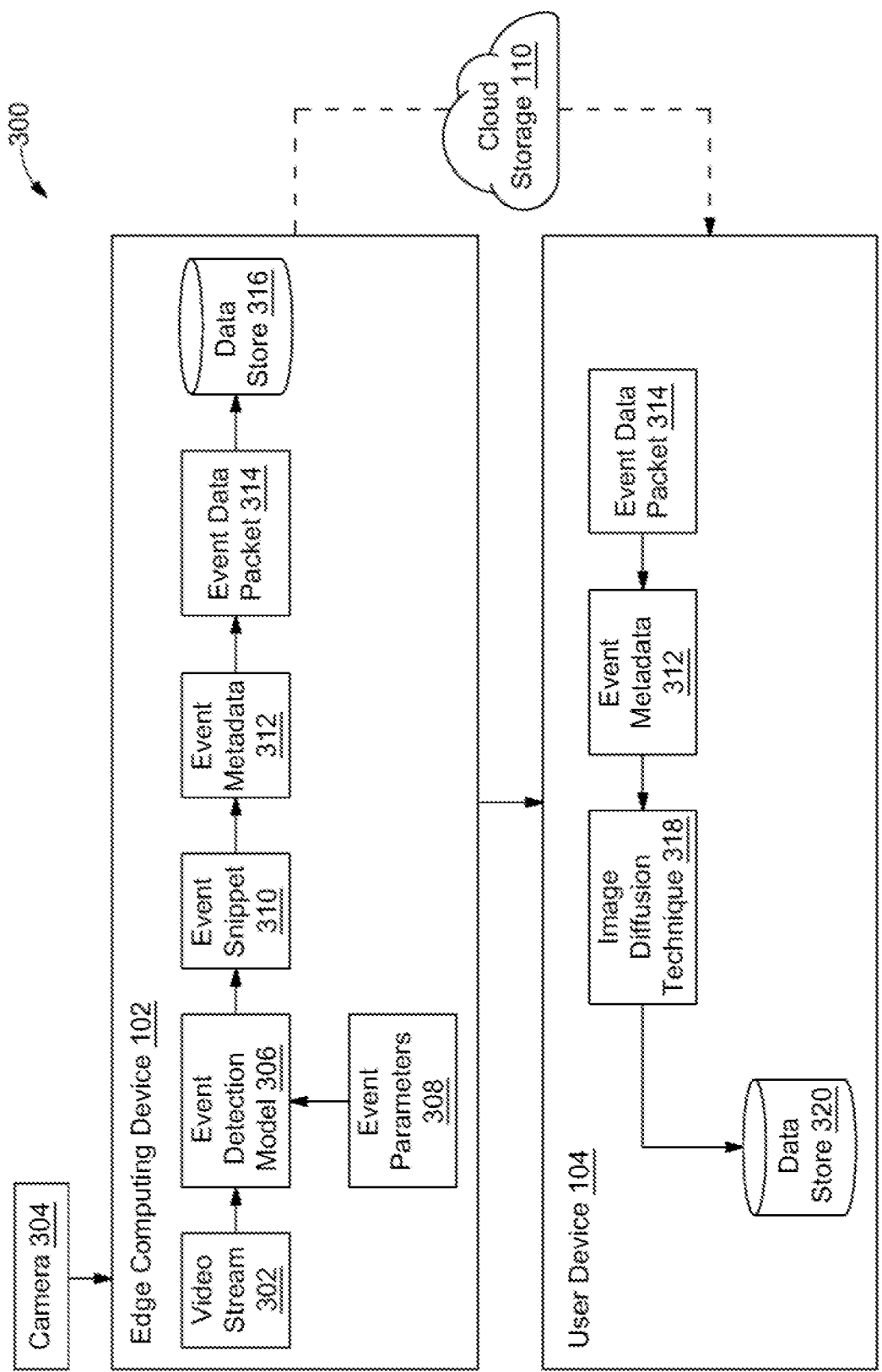
FIG. 3 illustrates an exemplary control logic for optimizing transmission of user relevant events, in accordance with some embodiments of the present disclosure.

FIG. 3 is an exemplary control logic 300 for optimizing transmission of user relevant events, in accordance with some embodiments of the present disclosure. FIG. 3 is explained in conjunction with FIGS. 1-2. The control logic includes the edge computing device 102 and the user device 104.

Initially, the edge computing device 102 may be configured to receive the multimedia content from at least one of the plurality of sources. The multimedia content may include a video stream 302. Further, the at least one of the plurality of sources may correspond to a camera 304. The camera 304 may be analogous to the Input/Output device 108 of the system 100. Upon receiving the video stream 302, an event detection model 306 may detect the user relevant event from the video stream 302 based on event parameters 308. In an embodiment, the event detection model 306 may correspond to the first AI model, i.e., the first AI engine 208 implemented within the edge computing device 102. Further, the event parameters 308 may be the associated set of event parameters. It should be noted that the event detection model 306 may be pre-trained to detect the user relevant event.

Examples of the event detection model 306 may include, but are not limited to, a Recurrent Neural Network (RNN) model, a Convolution Neural Network (CNN) model, a Long-Short Term Memory (LSTM) model, a Deep Neural Network (DNN) model, and radical function networks. In other words, the event parameters 308 may include the associated set of event parameters which may be used by the event detection model 306 to identify the user relevant event from the video stream 302.

By way of an example, consider a scenario where for security and safety purposes an owner of a house has installed a set of CCTV cameras in and around his house, covering key entry points and vulnerable areas. The owner may have installed the set of CCTV cameras to keep monitoring his house in real-time while the owner is away for work or vacation. Now suppose, the owner may have to leave his house unattended for a week. In this case, the set of CCTV cameras (same as the CCTV camera 304) may be configured to capture and record a video feed (i.e., the video stream 302) of surroundings area and area within the house where each of the set of CCTV cameras are installed.

Now suppose, a break-in attempt has been made by an intruder for robbery. In this case, the event detection model 306 may be configured to identify this event (i.e., the robbery event) as the user relevant event, from the video feed received via the set of CCTV cameras. The event detection model 306 may identify the robbery event from the video feed using an associated set of robbery event parameters, i.e., the event parameters 308. By way of an example, the associated set of event parameters in this case may include an unknown or masked intruder with a backpack, breaking of entry lock, arms held by the intruder, color of his cloths, movements and postures of the intruder, and the like.

Further, upon identifying the user relevant event, an event snippet 310 of the user relevant event may be extracted. Once the event snippet 310 is extracted, then details of the event, such as the start timestamp, the end timestamp, and the key information associated with the user relevant event may be extracted from the event snippet 310. Further, based on the event snippet 310, and the event details, an event metadata 312 may be generated. The event metadata 312 may include a set of frames associated with the user relevant event, the start timestamp and the end time stamp associated with the user relevant event, and the key information associated with the user relevant event. In the current embodiment, the set of frames may be generated from the event snippet 310 of the user relevant event.

In continuation to the above example, upon identifying the robbery event as the user relevant event, the event detection model 306 may extract an event snippet (same as the event snippet 310) of the robbery event from the video feed. In particular, the event detection model 306 may extract a portion of the video feed during which the presence of the intruder was encountered. Upon extracting the event snippet of the robbery event, the details of the robbery event, such as, the start timestamp, the end timestamp, and the key information associated with the robbery event may be extracted from the event snippet. Further, a robbery event metadata may be generated based on the event snippet and the event details. The robbery event metadata (same as the event metadata 312) may include a set of frames associated with the robbery event and the robbery event details.

Once the event metadata 312 is generated, then the event metadata 312 may be stored as an event data packet 314 within a data store 316 (same as the datastore within the memory 204 of the edge computing device 102). In some embodiments, the event metadata may be transmitted and stored as the event data packet 314 within the cloud storage 110 for future reference or for reconstruction of the user relevant event. The event metadata 312 may be transmitted to the cloud storage 110 via the communication network 106.

In continuation to the above example, the event metadata generated for the robbery event may be stored as the event data packet within the datastore 316 or the cloud storage 110. As will be appreciated, in some embodiment, upon identifying the user relevant event (such as the robbery event), the edge computing device 102 may be configured to notify a user (i.e., the owner) in real-time by sending an alert message or a trigger to the user.

Once the event metadata 312 is generated and stored, then the user input for reconstructing a segment associated with the user relevant event may be received by the user device 104. In some embodiments, upon receiving the alert message or the trigger the user may provide the user input. Further, upon receiving the user input, the user device 104 may reconstruct the segment associated with the user relevant event. In continuation to the above example, in some embodiment, the user input may be a user selection of the alert message. Further, based on the user input, the user device 104 may be configured to retrieve the event data packet 314 including the event metadata 312 from the data store 316. In some embodiment, the event data packet 314 may be retrieved from the cloud storage 110.

Further, upon retrieving the event data packet 314, the user device 104 may retrieve the event metadata 312 from the event data packet 314. Further, the user device 104 may generate reconstruct the segment of the user relevant content using the event metadata 312 by employing an image diffusion model 318, i.e., the second AI model (same as the second AI engine 216 present within the memory 214 of the user device 104). Examples of the image diffusion model 318 may include a stable diffusion model, a denoising diffusion probabilistic model, a noise conditioned score network, and a stochastic differential equation, and the like.

In continuation to the above example of the robbery event, upon receiving the user selection, the image diffusion model 318 may be configured to retrieve the event data packet 314 from the datastore 316 or the cloud storage 110. Upon retrieving the event data packet 314, the image diffusion model 318 may retrieve the event metadata 312 of the robbery event from the event data packet 314. Further, the image diffusion model 318 may reconstruct the segment (i.e., the portion during which the presence of the intruder was detected) of the video feed associated with the robbery event using the event metadata 312 of the robbery event. Once the segment is generated, the segment may be presented to the user (i.e., the owner) via the GUI of the user device 104.

In an embodiment, the reconstructed segment of the user relevant event may be stored in a data store 320 to access the user relevant event in near future. As will be appreciated, the event metadata 312 may be transmitted from the datastore 316 of the edge computing device 102 or the cloud storage 110 to the user device 104 at a low bandwidth. This may enable the user to view the user relevant event (for example: the segment of the robbery event) even in location with network issues as the user does not have to retrieve and view the complete video stream 304. For example, in case of the robbery event, since the owner of the house is able to view only the segment of the robbery event when he is away. Hence, in this case, the owner may be able to take immediate actions like informing local law enforcement or neighbors to check their property or use the segment of a video to register complaint.

Figure 4:
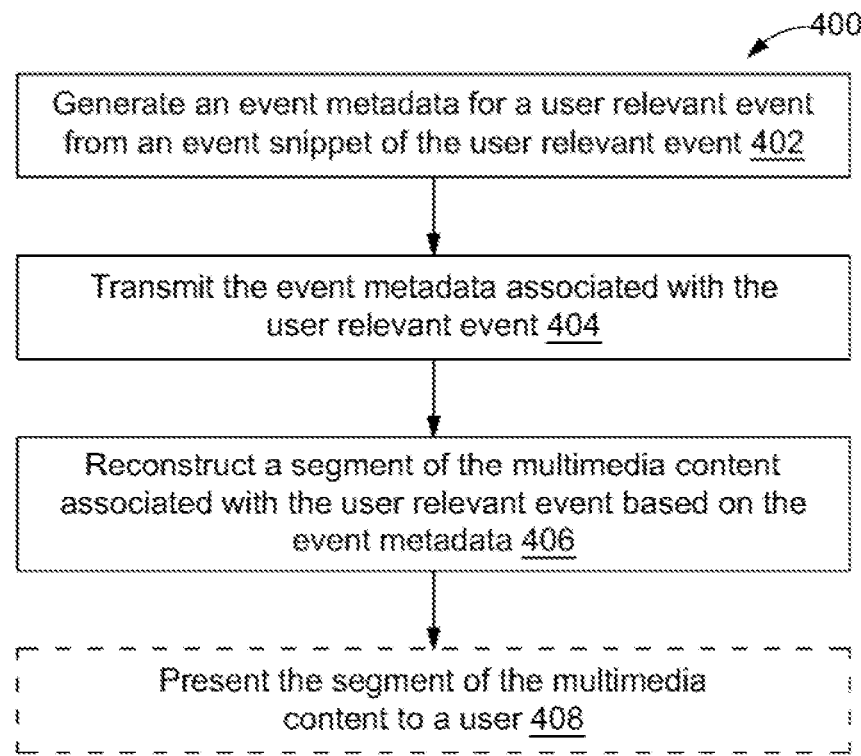
FIG. 4 illustrates a flow diagram of an exemplary process for optimizing transmission of user relevant events, in accordance with some embodiments of the present disclosure.

FIG. 4 is a flow diagram of an exemplary process 400 for optimizing transmission of user relevant events, in accordance with an exemplary embodiment of the present disclosure. FIG. 4 is explained in conjunction with FIGS. 1-3.

At step 402, an event metadata for a user relevant event may be generated. In an embodiment, the event metadata may be generated from an event snippet of the user relevant event. The event snippet may be obtained from a multimedia content received from at least one of a plurality of sources. The multimedia content may include at least one of an audio stream or a video stream. It should be noted that the user relevant event may correspond to an important incident within the multimedia content. Further, the multimedia content may be pre-recorded multimedia content, or real-time multimedia content. The event metadata generated for the user relevant event may be significantly smaller in size as compared to the multimedia content (for example, a full video file or a full audio file).

In an embodiment, the event metadata may be generated by a first AI model. With reference to FIG. 2, the first AI model may correspond to the first AI engine 208. The first AI engine 208 may be an event detection model. Examples of the event detection model may include, but are not limited to, a Recurrent Neural Network (RNN) model, a Convolution Neural Network (CNN) model, a Long-Short Term Memory (LSTM) model, a Deep Neural Network (DNN) model, and radical function networks. A method of generating the event metadata for the user relevant event is further explained in detail in conjunction with FIG. 5.

Once the event metadata is generated, at step 404, the event metadata associated with the user relevant event may be transmitted by the first AI model to a second AI model. With reference to FIG. 2, the second AI model may correspond to the second AI engine 216. The second AI model may be an image diffusion model. Examples of the image diffusion model may include a stable diffusion model, a denoising diffusion probabilistic model, a noise-conditioned score network, a stochastic differential equation, and the like.

In some embodiments, the event metadata may include a set of frames associated with the user relevant event, a start timestamp and an end time stamp associated with the user relevant event, and key information associated with the user relevant event. Further, at step 406, a segment of the multimedia content associated with the user relevant event may be reconstructed. The segment of the multimedia content may be reconstructed based on the event metadata. In an embodiment, the reconstruction of the segment of the multimedia content associated with the user relevant event may be performed by the second AI model. A method of reconstructing the segment of the multimedia content associated with the user relevant event is further explained in detail in conjunction with FIG. 6. Further, at step 408, the reconstructed segment associated with the user relevant event may be presented to a user via a GUI of a user device. With reference to FIG. 1, the user device may correspond to the user device 104.

Figure 5:
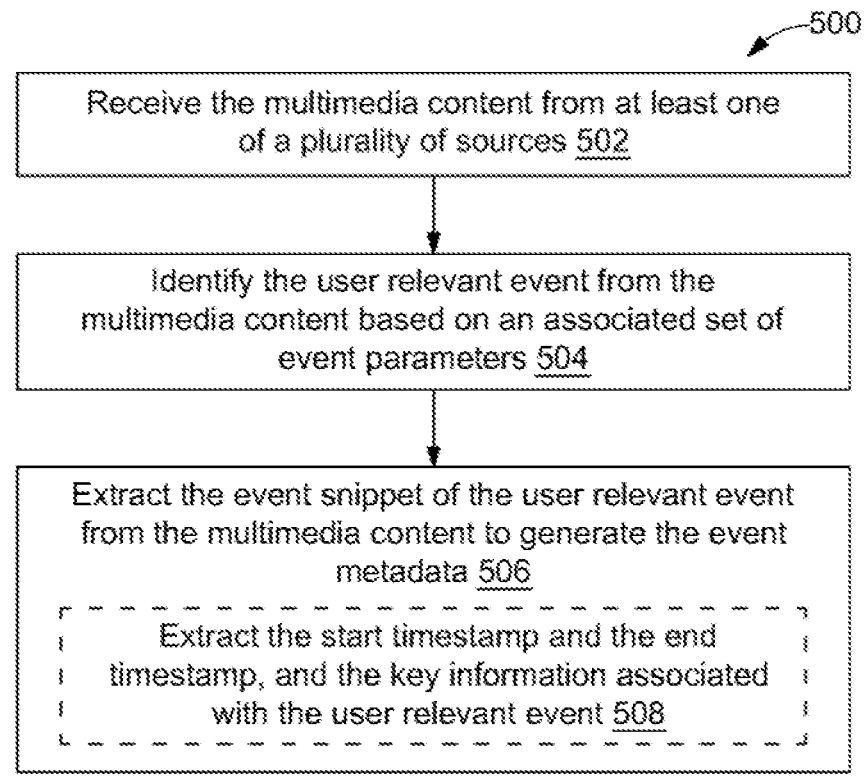
FIG. 5 illustrates a flow diagram of an exemplary process for generating event metadata, in accordance with some embodiments of the present disclosure.

FIG. 5 is a flow diagram of an exemplary process 500 for generating an event metadata, in accordance with an exemplary embodiment of the present disclosure. Each step of the process 500 may be executed by the first AI engine 208 (i.e., the first AI model) of the edge computing device 102. FIG. 5 is explained in conjunction with FIGS. 1-4.

In order to generate the event metadata for the user relevant event, initially, at step 502, the multimedia content may be received from at least one of the plurality of sources. In an embodiment, the multimedia content may correspond to pre-stored multimedia content (for example, downloaded video or audio content), or real-time multimedia content. In the case of the pre-stored multimedia content, the plurality of sources may correspond to any social media platform, and the like. Further, in the case of the real-time multimedia content, the plurality of sources may correspond to one or more CCTV cameras, webcams, surveillance cameras, and the like. The multimedia content may be received by the first AI model.

Upon receiving the multimedia content, at step 504, the user relevant event may be identified from the multimedia content. The user relevant event may be identified based on an associated set of event parameters. Examples for the associated set of event parameters may include, but not limited to, a type of event, one or more objects (e.g., a vehicle, a person, and the like) identified during occurrence of the event, pose or movement of the one object during the event, features (e.g., a type of object, color of the object) associated with the object, suspicious activity associated with the object, and the like. As will be appreciated, the user relevant event may be identified via the first AI model. In some embodiments, the first AI model may be trained to detect user relevant events based on a plurality of training event parameters associated with a plurality of training events.

Once the user relevant event is identified, at step 506, the event snippet of the user relevant event may be extracted from the multimedia content. The event snippet may be extracted to generate the event metadata. In addition to extracting the event snippet, at step 506, details associated with the user relevant event may be extracted from the event snippet. The details may include the start timestamp and the end timestamp associated with user relevant event, and the key information associated with the user relevant event. Further, based on the event snippet and the details associated with the user relevant event, the event metadata may be generated. The event metadata may include the set of frames associated with the user relevant event, the start timestamp and the end time stamp associated with the user relevant event, and the key information associated with the user relevant event. It should be noted that the set of frames may be generated using the event snippet.

Figure 6:
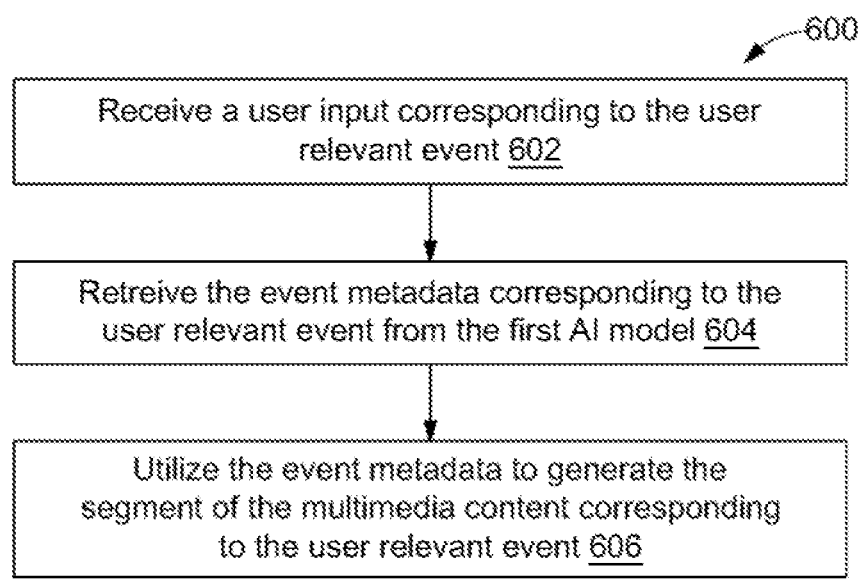
FIG. 6 illustrates a flow diagram of an exemplary process for reconstructing a segment of multimedia content associated with a user relevant event, in accordance with some embodiments of the present disclosure.

FIG. 6 is a flow diagram of an exemplary process 600 for reconstructing the segment of the multimedia content, in accordance with an exemplary embodiment of the present disclosure. Each step of the process 600 may be executed by the second AI engine 216 (same as the second AI model) of the user device 104. FIG. 6 is explained in conjunction with FIGS. 1-5.

In order to reconstruct the segment of the multimedia content, initially at step 602, a user input corresponding to the user relevant event may be received by the second AI model. In an embodiment, the user relevant event may correspond to an incidence of importance within the multimedia content. Further, the user input may be a user selection corresponding to the user relevant event. Upon receiving the user input, at step 604, the event metadata corresponding to the user relevant event may be retrieved. The event metadata may be retrieved by the second AI model from the first AI model.

In some embodiments, the event metadata may be extracted from a cloud storage (same as the cloud storage 110). Once the event metadata is retrieved by the second AI model, then at step 606, the event metadata may be utilized to generate the segment of the multimedia content associated with the user relevant event. Once the segment associated with the user relevant event is reconstructed, then the segment may be presented to the user.

Figure 7:
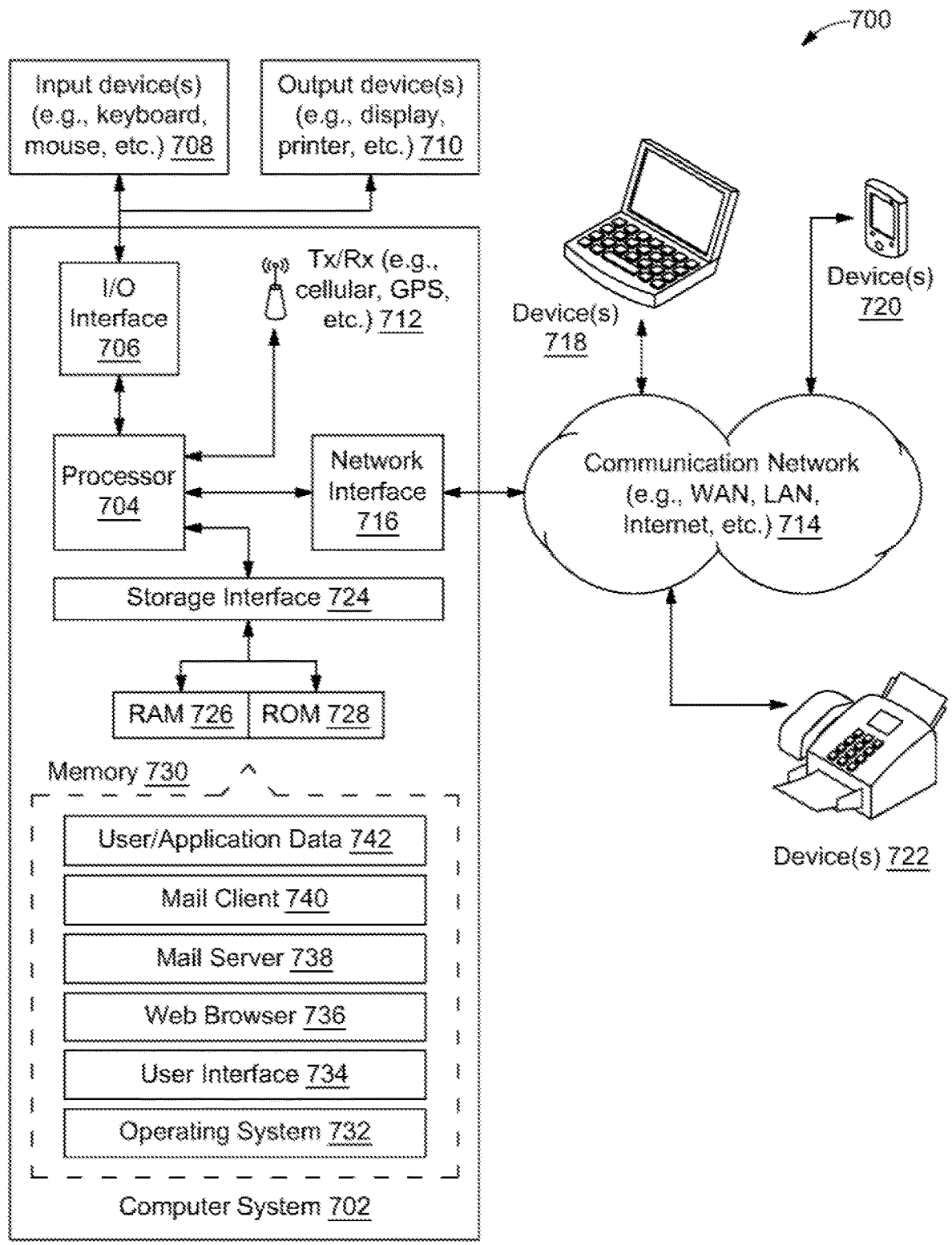
FIG. 7 is a block diagram that illustrates a system architecture of a computer system for optimizing transmission of user relevant events, in accordance with an exemplary embodiment of the present disclosure.

The disclosed methods and systems may be implemented on a conventional or a general-purpose computer system, such as a personal computer (PC) or server computer. FIG. 7 is a block diagram that illustrates a system architecture 700 of a computer system 702 for optimizing transmission of user relevant events, in accordance with an exemplary embodiment of the present disclosure. Computer system 702 may include a central processing unit ("CPU" or "processor") 704. Processor 704 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via I/O interface 706. The I/O interface 706 may employ communication protocols/methods such as, without limitation, audio, analog, digital, monoaural, RCA, stereo, IEEE-1394, near field communication (NFC), Fire Wire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 706, the computer system 702 may communicate with one or more I/O devices. For example, the input device 708 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 710 may be a printer, fax machine, video display (e.g., cathode ray tube (CRT), liquid crystal display (LCD), light-emitting diode (LED), plasma, or the like), audio speaker, etc. In some embodiments, a transceiver 712 may be disposed in connection with the processor 704. The transceiver 712 may facilitate various types of wireless transmission or reception. For example, the transceiver 712 may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 1436-PMB9800® transceiver, or the like), providing IEEE 802.11a/b/g/n, Bluetooth, FM, global positioning system (GPS), 2G/3G HSDPA/HSUPA communications, etc.

In some embodiments, the processor 704 may be disposed in communication with a communication network 714 via a network interface 716. The network interface 716 may communicate with the communication network 714. The network interface 716 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 714 may include, without limitation, a direct interconnection, local area network (LAN), wide area network (WAN), wireless network (e.g., using Wireless Application Protocol), the Internet, etc. Using the network interface 716 and the communication network 714, the computer system 702 may communicate with devices 718, 720, and 722. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLER, NOOK® etc.), laptop computers, notebooks, gaming consoles (MICROSOFT® XBOX®, NINTENDO® DS®, SONY® PLAYSTATION®, etc.), or the like. In some embodiments, the computer system 702 may itself embody one or more of these devices.

In some embodiments, the processor 704 may be disposed in communication with one or more memory devices 730 (e.g., RAM 726, ROM 728, etc.) via a storage interface 724. The storage interface 724 may connect to memory devices 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 730 may store a collection of program or database components, including, without limitation, an operating system 732, user interface 734, web browser 736, mail server 738, mail client 740, user/application data 742 (e.g., any data variables or data records discussed in this disclosure), etc. The operating system 732 may facilitate resource management and operation of the computer system 702. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8/10/11, etc.), APPLE® IOS®, GOOGLE® ANDROID®, BLACKBERRY® OS, or the like. User interface 734 may facilitate display, execution, interaction, manipulation, or operation of program components through textual or graphical facilities. For example, user interfaces may provide computer interaction interface elements on a display system operatively connected to the computer system 702, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 702 may implement a web browser 736 stored program component. The web browser 736 may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 702 may implement a mail server 738 stored program component. The mail server 738 may be an Internet mail server such as MICROSOFT® EXCHANGE®, or the like. The mail server 738 may utilize facilities such as ASP, ActiveX, ANSI C++/C#, MICROSOFT.NET® CGI scripts, JAVA®, JAVASCRIPT®, PERL®, PHP®, PYTHON®, WebObjects, etc. The mail server 738 may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 702 may implement a mail client 740 stored program component. The mail client 740 may be a mail viewing application, such as APPLE MAIL®, MICROSOFT ENTOURAGE®, MICROSOFT OUTLOOK®, MOZILLA THUNDERBIRD®, etc.

In some embodiments, computer system 702 may store user/application data 742, such as the data, variables, records, etc. (e.g., the set of predictive models, the plurality of clusters, set of parameters (batch size, number of epochs, learning rate, momentum, etc.), accuracy scores, competitiveness scores, ranks, associated categories, rewards, threshold scores, threshold time, and so forth) as described in this disclosure. Such databases may be implemented as fault-tolerant, relational, scalable, secure databases such as ORACLE® OR SYBASE® OR POSTGRESQL® OR any such similar data. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

The disclosure provides a method and a system for optimizing transmission of user relevant events. The disclosed method and the system may generate an event metadata for a user relevant event from an event snippet of the user relevant event using a first AI model. The event snippet may be obtained from a multimedia content. Further, the multimedia content may include at least one of an audio stream or a video stream. The disclosed method and the system may transmit the event metadata associated with the user relevant event using the first AI model to a second AI model. The event metadata may include a set of frames associated with the user relevant event, a start timestamp and an end time stamp associated with the user relevant event, and key information associated with the user relevant event. The disclosed method and the system may reconstruct a segment of the multimedia content associated with the user relevant event based on the event metadata using the second AI model.

As will be appreciated by those skilled in the art, the techniques described in the various embodiments discussed above are not routine, or conventional, or well understood in art. The techniques discussed above may optimize transmission of user relevant events. The above discussed techniques may reduce the bandwidth required to transmit the user relevant event (i.e., a portion of the video stream including the incidence of importance) while still providing a high-quality visual representation of the user relevant event (or an incident) that occur in the video stream. This is because by using the above discussed techniques the transmission of only essential information (i.e., the event metadata) is required to reconstruct a relevant segment of the user relevant event. Further, the above discussed techniques enable transmission of the user relevant event in low-bandwidth environments. By reducing the amount of transmission data (i.e., the event metadata) of the multimedia content, the above discussed techniques greatly reduce the cost of transmitting the user relevant event over long distances in remote monitoring scenario. For example, in security applications, where the ability to monitor and respond to events in real-time is critical, the above discussed technique may enable security personnel to access high-quality feeds (audio or video) of the user relevant event even in locations where the available bandwidth is limited. This may help to improve situational awareness and enhance response times, which can be crucial in preventing or responding to security incidents.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for optimizing transmission of user relevant events, the method comprising:
   generating, by a first Artificial Intelligence (AI) model, an event metadata for a user relevant event from an event snippet of the user relevant event, wherein the event snippet is obtained from a multimedia content, and wherein the multimedia content comprises at least one of an audio stream or a video stream;
   transmitting, by the first AI model to a second AI model, the event metadata associated with the user relevant event, wherein the event metadata comprises a set of frames associated with the user relevant event, a start timestamp and an end time stamp associated with the user relevant event, and key information associated with the user relevant event; and
   reconstructing, by the second AI model, a segment of the multimedia content associated with the user relevant event based on the event metadata.

2. The method of claim 1, wherein generating the event metadata comprises:
   receiving, by the first AI model, the multimedia content from at least one of a plurality of sources;
   identifying, by the first AI model, the user relevant event from the multimedia content based on an associated set of event parameters; and
   upon identifying, extracting, by the first AI model, the event snippet of the user relevant event from the multimedia content to generate the event metadata.

3. The method of claim 2, comprising:
   upon identifying the user relevant event, extracting, by the first AI model, the start timestamp and the end timestamp, and the key information associated with the user relevant event.

4. The method of claim 2, wherein the first AI model is trained to detect user relevant events based on a plurality of training event parameters associated with a plurality of training events.

5. The method of claim 1, wherein the segment of the multimedia content associated with the user relevant event is reconstructed based on an image diffusion technique.

6. The method of claim 1, wherein reconstructing the segment of the multimedia content comprises:
   receiving, by the second AI model, a user input corresponding to the user relevant event;
   retrieving, by the second AI model, the event metadata corresponding to the user relevant event from the first AI model, upon receiving the user input; and
   utilizing, by the second AI model, the event metadata to generate the segment of the multimedia content corresponding to the user relevant event.

7. The method of claim 1, comprising:
   presenting, via a Graphical User Interface (GUI), the segment of the multimedia content to a user.

8. The system of claim 1, wherein, to generate the event metadata, the processor instructions, on execution, further causes the processing circuitry to:
   receive, by the first AI model, the multimedia content from at least one of a plurality of sources;
   identify, by the first AI model, the user relevant event from the multimedia content based on an associated set of event parameters; and
   upon identifying, extract, by the first AI model, the event snippet of the user relevant event from the multimedia content to generate the event metadata.

9. The system of claim 8, wherein the processor instructions, on execution, further cause the processing circuitry to:
   upon identifying the user relevant event, extract, by the first AI model, the start timestamp and the end timestamp, and the key information associated with the user relevant event.

10. The system of claim 8, wherein the first AI model is trained to detect user relevant events based on a plurality of training event parameters associated with a plurality of training events.

11. A system for optimizing transmission of user relevant events, the system comprising:
    a processing circuitry; and
    a memory communicatively coupled to the processing circuitry, wherein the memory stores processor-executable instructions, which, on execution, causes the processing circuitry to:
       generate an event metadata for a user relevant event from an event snippet of the user relevant event by a first Artificial Intelligence (AI) model, wherein the event snippet is obtained from a multimedia content, and wherein the multimedia content comprises at least one of an audio stream or a video stream;
       transmit the event metadata associated with the user relevant event by the first AI model to a second AI model, wherein the event metadata comprises a set of frames associated with the user relevant event, a start timestamp and an end time stamp associated with the user relevant event, and key information associated with the user relevant event; and
       reconstruct a segment of the multimedia content associated with the user relevant event based on the event metadata by the second AI model.

12. The system of claim 11, wherein the segment of the multimedia content associated with the user relevant event is reconstructed based on an image diffusion technique.

13. The system of claim 11, wherein, to reconstruct the segment of the multimedia content, the processor instructions, on execution, further causes the processing circuitry to:
    receive, by the second AI model, a user input corresponding to the user relevant event;
    retrieve, by the second AI model, the event metadata corresponding to the user relevant event from the first AI model, upon receiving the user input; and
    utilize, by the second AI model, the event metadata to generate the segment of the multimedia content corresponding to the user relevant event.

14. The system of claim 11, wherein the processor instructions, on execution, further causes the processing circuitry to:
    present, via a Graphical User Interface (GUI), the segment of the multimedia content to a user.

15. A non-transitory computer-readable medium storing computer-executable instructions for optimizing transmission of user relevant events, the stored instructions, when executed by a processor, cause the processor to perform operations comprising:
    generating, by a first Artificial Intelligence (AI) model, an event metadata for a user relevant event from an event snippet of the user relevant event, wherein the event snippet is obtained from a multimedia content, and wherein the multimedia content comprises at least one of an audio stream or a video stream;
    transmitting, by the first AI model to a second AI model, the event metadata associated with the user relevant event, wherein the event metadata comprises a set of frames associated with the user relevant event, a start timestamp and an end time stamp associated with the user relevant event, and key information associated with the user relevant event; and reconstructing, by the second AI model, a segment of the multimedia content associated with the user relevant event based on the event metadata.

\* \* \* \* \*